United States Patent [19]

Godfrey et al.

[11] Patent Number: 5,360,238
[45] Date of Patent: Nov. 1, 1994

[54] PIPE COUPLINGS

[75] Inventors: Geoffrey C. Godfrey, Mansfield, England; David Bassett, Marple Bridge, United Kingdom

[73] Assignee: Underpressure Engineering Co., Limited, Nottinghamshire, England

[21] Appl. No.: 45,993

[22] Filed: Apr. 9, 1993

[30] Foreign Application Priority Data

Apr. 10, 1992 [GB] United Kingdom ............ 9207924.3
May 1, 1992 [GB] United Kingdom ............ 9209547.0

[51] Int. Cl.[5] ............................................. F16L 35/00
[52] U.S. Cl. ........................................ 285/93; 285/323; 285/342; 285/369; 285/331; 285/906
[58] Field of Search ..................... 285/322, 323, 334.2, 285/906, 368, 337, 93, 12, 369, 382.7, 341, 342, 331

[56] References Cited

U.S. PATENT DOCUMENTS

| | | | |
|---|---|---|---|
| 1,622,768 | 3/1927 | Cook et al. ............... | 285/368 X |
| 2,452,278 | 10/1948 | Woodling .................. | 285/382.7 X |
| 2,727,761 | 12/1955 | Elliott et al. ............. | 285/322 X |
| 3,649,050 | 3/1972 | Woodling .................. | 285/12 |
| 4,054,305 | 10/1977 | Gajajiva ................... | 285/93 X |
| 4,575,274 | 3/1986 | Hayward ................... | 285/323 X |
| 4,832,379 | 5/1989 | Smith et al. ............... | 285/323 |

FOREIGN PATENT DOCUMENTS

| | | | |
|---|---|---|---|
| 1420487 | 11/1965 | France ....................... | 285/368 |
| 2110784 | 6/1983 | United Kingdom . | |

OTHER PUBLICATIONS

U.K. Search Report dated Jun. 24, 1993 For Application No. GB9307313.8, GB 2110784.

Primary Examiner—Dave W. Arola
Attorney, Agent, or Firm—Trexler, Bushnell, Giangiorgi & Blackstone, Ltd.

[57] ABSTRACT

A metal fitting (11) for an end of a plain length of pipe (12) comprises a body (13) with flange means (14) adjacent a first end (15), a gland ring (16) adjacent the other end (17) of the body, a grip ring (18) between the body (13) and the gland ring (16), and screw fasteners (19) for urging the gland ring (16) towards the flange means (14); characterised in that:

the body (13) has an integral outer tubular spigot (20) projecting towards the gland ring (16) and a coaxial integral inner tubular spigot (21) having a cylindrical outer surface (22) projecting beyond the free end (23) of the outer tubular spigot (20), the inside (24) of the outer spigot (20) being provided with a frustoconical portion (25) adjacent and converging from that free end;

the gland ring (16) has its inside provided with a similar frustoconical portion (26) converging in the opposite direction;

and the grip ring (18) is a split ring having external surfaces (27, 28) mating with the frustoconical portions in the body (13) and the gland ring (16), and internal circumferentially disposed ribs (29) initially spaced radially from the cylindrical outer surface (22) of the inner spigot (21) by no less than the thickness (T) of a plain length of pipe (12) on one end of which the metal fitting (11) is intended to be fitted.

8 Claims, 4 Drawing Sheets

PIPE COUPLINGS

This invention relates to pipe couplings of the type in which a metal fitting is sealingly secured on an end of a plain length of "rigid" plastics pipe, e.g., polyethylene.

An object of the present invention is to provide such a metal fitting which when secured on a pipe withstands test pressures and is "fully end load restrained", i.e., the pipe should break before it can pull out of the fitting.

Another object is to provide such a metal fitting which is readily fitted on site without requiring special tooling or associated equipment.

A further object is to provide such a metal fitting with means for indicating that the fitting has been properly positioned on a pipe.

Yet another object is to provide such a metal fitting with means for indicating that the fitting has been satisfactorily fitted on a pipe.

According to the present invention, a metal fitting for an end of a plain length of pipe comprises a body with flange means adjacent a first end, a gland ring adjacent the other end of the body, a grip ring between the body and the gland ring, and screw fasteners for urging the gland ring towards the flange means; characterised in that:

the body has an integral outer tubular spigot projecting towards the gland ring and a co-axial integral inner tubular spigot having a cylindrical outer surface projecting beyond the free end of the outer tubular spigot, the inside of the outer spigot being provided with a frustoconical portion adjacent and converging from that free end;

the gland ring has its inside provided with a similar frustoconical portion converging in the opposite direction;

and the grip ring is a split ring having external surfaces mating with the frustoconical portions in the body and the gland ring, and internal circumferentially disposed ribs initially spaced radially from the cylindrical outer surface of the inner spigot by no less than the thickness of a plain length of pipe on one end of which the metal fitting is intended to be fitted.

After insertion of a plain pipe end between the inner spigot of the body and the grip ring, the screw fasteners are tightened to urge the gland ring towards the flange means, whereby the wedging action of the external surfaces on the grip ring within the frustoconical portions inside the outer spigot and the gland ring causes the grip ring to be urged radially inwards and its internal ribs to dig into the pipe, thus securing the metal fitting on the pipe and effecting sealing between the inside of the pipe and the outside of the inner spigot.

The outer spigot of the body preferably has a notch extending from its free end to beyond the adjacent edge of the grip ring, to enable the end proper of an inserted pipe to be brought into view to indicate proper positioning of the metal fitting on the pipe before tightening of the screw fasteners.

The frustoconical portions inside the outer spigot of the body and the gland ring, and the mating external surfaces on the grip ring, may have a cone angle in the range of 10° to 20°, preferably 15° to facilitate on site tightening of the screw fasteners by a wrench or spanner without undue effort or leverage; which screw fasteners are conveniently bolts through holes in the flange means and the gland ring, with bolt heads in matching recesses in the flange means or in the gland ring and with nuts and washers abutting the gland ring or the flange means, as the case may be.

The internal circumferentially disposed ribs of the grip ring are preferably generally semicircular in axial cross-section and spaced apart by cylindrical portions of the inside of the ring; the rib at the gland ring end of the grip ring is preferably spaced from the adjacent end proper of the grip ring by a cylindrical portion of the inside of the grip ring, so that, after tightening of the screw fasteners by the requisite amount, the gap between the outside of an inserted pipe and that end proper of the grip ring will be fully closed, thus indicating full penetration of the ribs into the pipe; conveniently, the rib at the other end of the grip ring is similarly spaced from the adjacent end proper, so that the grip ring can be inserted either way round in the fitting.

The external surfaces on the grip ring, mating with the frustoconical portions inside the outer spigot and the gland ring, may be provided on axially disposed ribs, whereby the portions of reduced thickness of the grip ring between the axially disposed ribs ensure adequate flexibility in the grip ring, but for larger pipe diameters, e.g., above 90 mm the external surfaces of the grip ring are preferably substantially complete surfaces of revolution, i.e., non-ribbed.

The flange means may be a flange integral with the first end of the body and the holes in the flange may be circumferentially spaced intermediate holes for bolts for securing the flange to another flanged fitting; and the flange may extend radially from a spigot or socket for mating with a socket or spigot, as the case may be, on another similarly flanged fitting.

Alternatively, the flange means may be the gland ring of a compression seal having an elastomeric sealing ring in a socket in the first end of the body, e.g., for sealing on to a plain pipe end of e.g., cast iron, steel, UPVC or asbestos-cement, in which case the screw fasteners may extend from one gland ring to the other.

Again, the flange means may be another gland ring adjacent the first end of the body and similar to the gland ring at the other end of the body, together with similar outer and inner tubular spigots integral with the first end of the body, and a similar grip ring, i.e., for securing and sealing on another plain pipe end, e.g., of "rigid" plastics, in which case the screw fasteners may extend from one gland ring to the other.

An alternative to screw fasteners extending from one gland ring to the other comprises an intermediate flange integral with the body (or a pair of intermediate integral flanges) to which the screw fasteners extend from the gland rings.

Embodiments of the invention and components for use therein will now be described, by way of example only, with reference to the accompanying drawings, in which.

Figure 1:
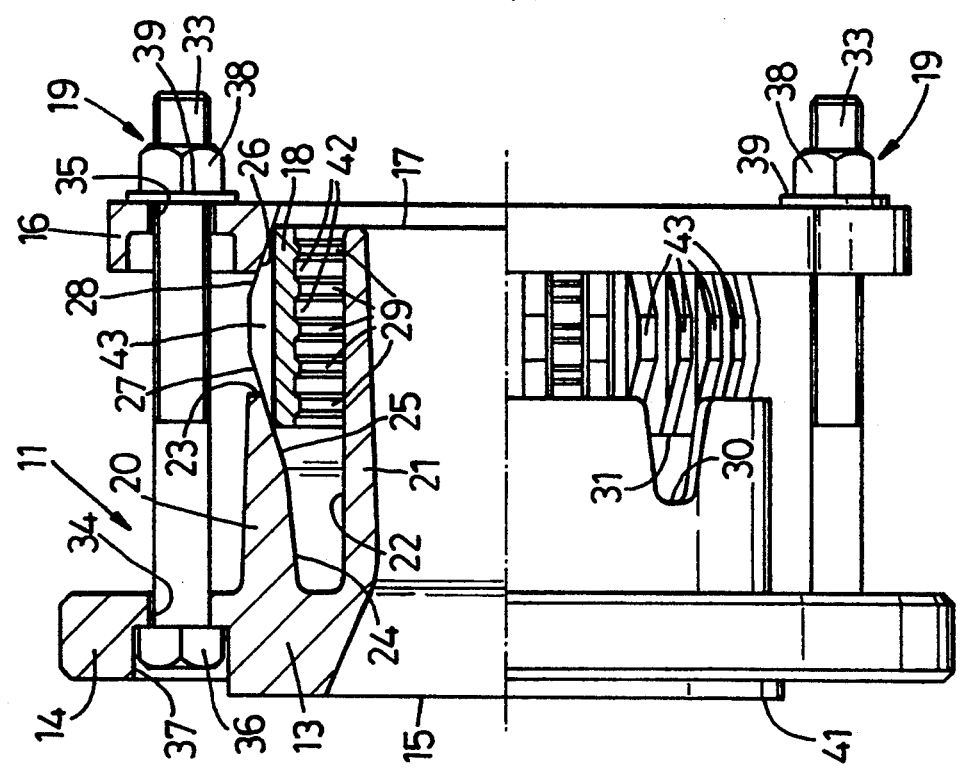
FIG. 1 is a half-sectional side elevation of a metal fitting in accordance with the invention.
Figure 4:
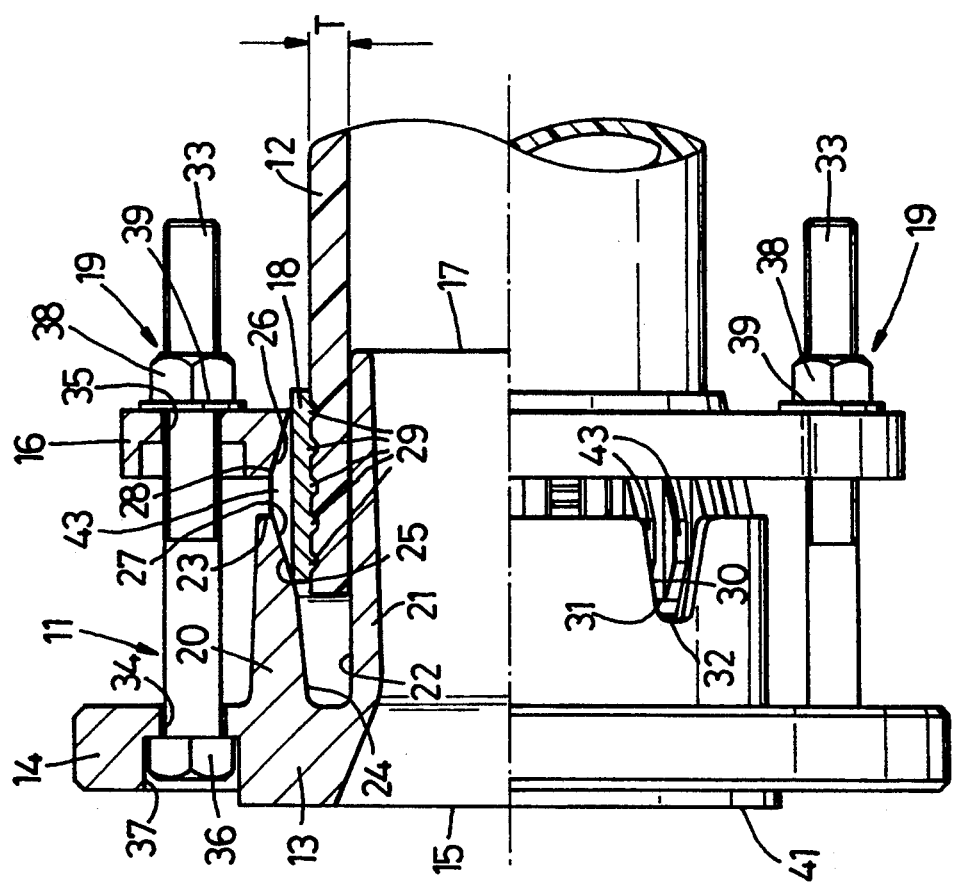
Figure 3:
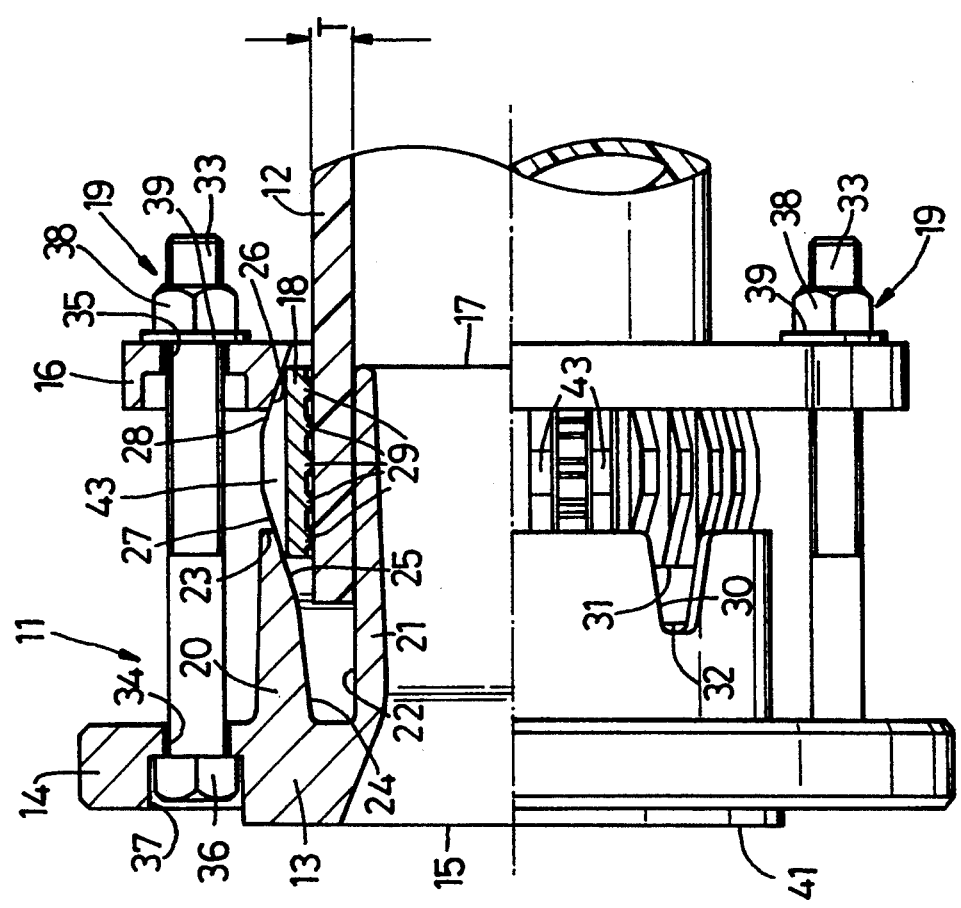
Figure 5:
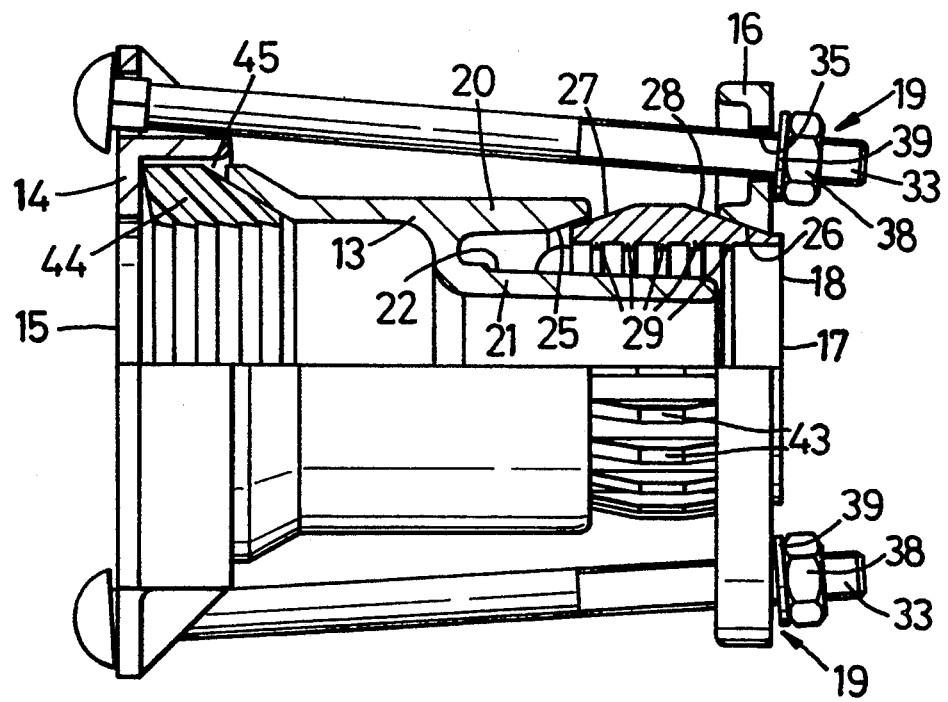
Figure 6:
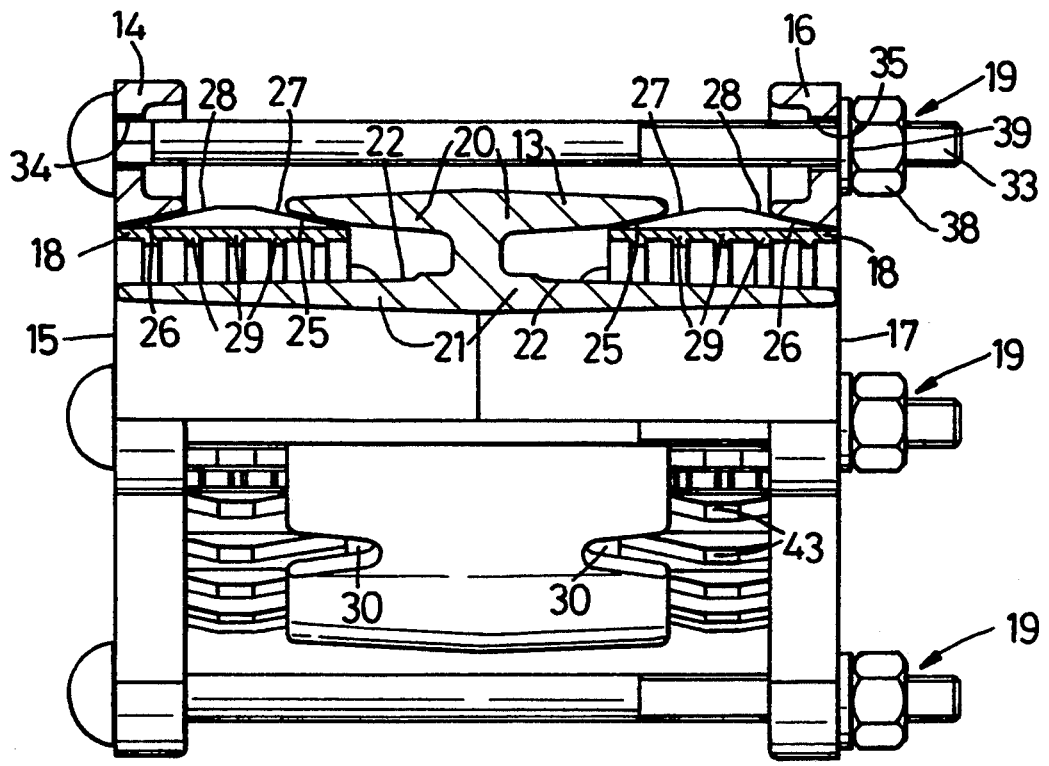
Figure 7:
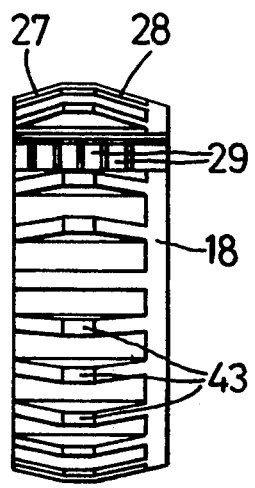
Figure 8:
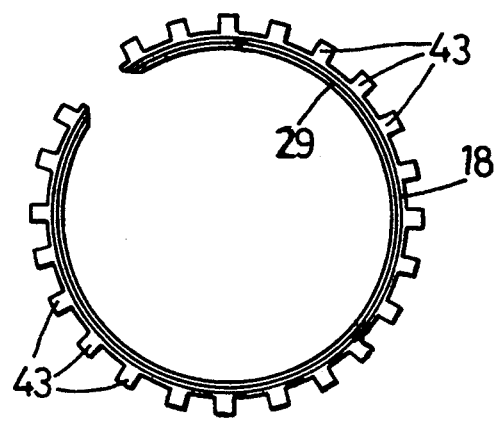
Figure 9:
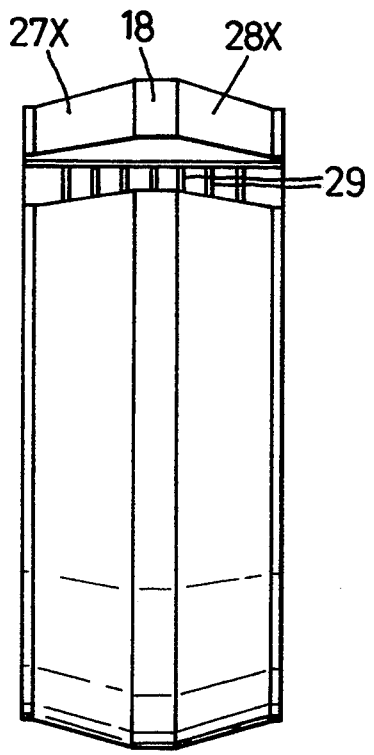
Figure 10:
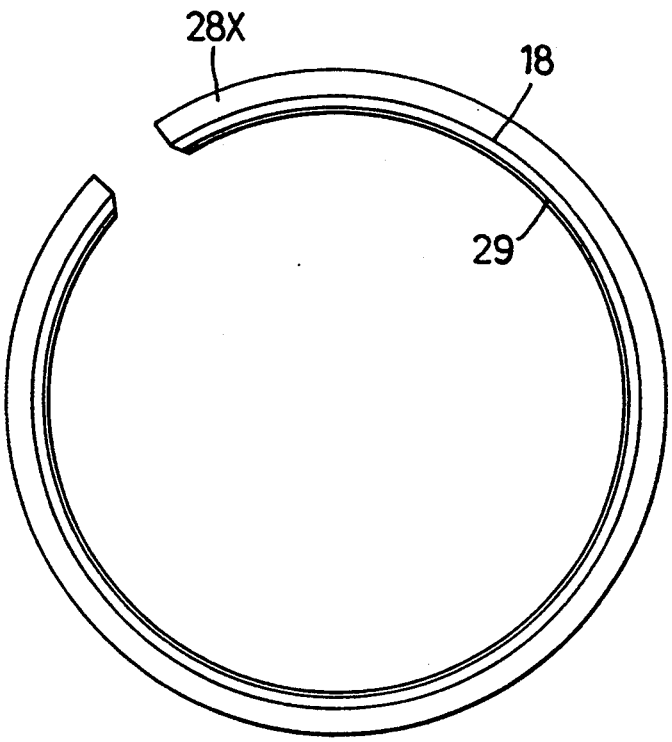

FIG. 3 corresponds to FIG. 1 but shows a plain plastics pipe and inserted between the inner spigot of the body of the fitting and the grip ring;

FIG. 4 corresponds to FIG. 3 but shows the assembly after tightening of the screw fasteners;

FIGS. 5 and 6 each correspond to FIG. 1 but show alternative embodiments of the invention;

FIG. 7 is a side elevation of a grip ring for use in a metal fitting in accordance with the invention and suitable for pipe diameters of say up to 90 mm;

FIG. 8 is an end elevation of the grip ring of FIG. 7 as seen from the right hand side; and FIGS. 9 and 10 correspond to FIGS. 7 and 8 but show a grip ring form preferred for pipe diameters of say greater than 90 mm.

Figure 2:
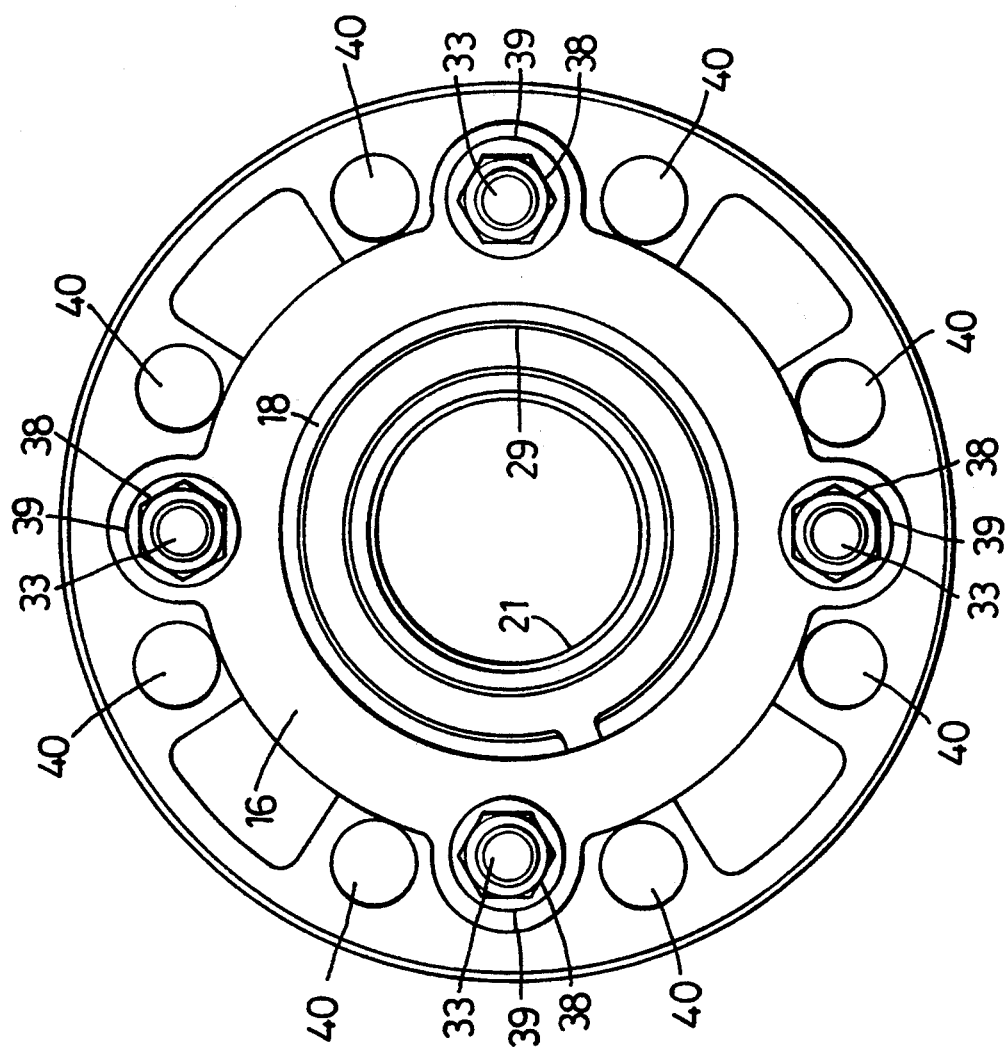
FIG. 2 is an end elevation of the fitting of FIG. 1 as see the right hand side.

In FIGS. 1 and 2 a metal fitting 11 for an end of a plain length of plastics pipe 12 (see FIGS. 3 and 4) comprises a body 13 with flange means 14 adjacent a first end 15, a gland ring 16 adjacent the other end 17 of the body, a grip ring 18 between the body 13 and the gland ring 16, and screw fasteners 19 for urging the gland ring 16 towards the flange means 14; characterised in that:

the body 13 has an integral outer tubular spigot 20 projecting towards the gland ring 16 and a co-axial integral inner tubular spigot 21 having a cylindrical outer surface 22 projecting beyond the free end 23 of the outer tubular spigot 20, the inside 24 of the outer spigot being provided with a frustoconical portion 25 adjacent and converging from that free end;

the gland ring 16 has its inside provided with a similar frustoconical portion 26 converging in the opposite direction;

and the grip ring 18 is a split ring having external surfaces 27, 28 mating with the frustoconical portions 25, 26 in the body 13 and the gland ring 16, and internal circumferentially disposed ribs 29 initially spaced radially from the cylindrical outer surface 22 of the inner spigot 21 by no less than the thickness T of the plain length of plastics pipe 12 on one end of which the metal fitting 11 is intended to be fitted.

After insertion of the plain pipe end 12 between the inner spigot 21 of the body 13 and the grip ring 18, as shown in FIG. 3, the screw fasteners 19 are tightened to urge the gland ring 16 towards the flange means 14, whereby the wedging action of the external surfaces 27, 28 on the grip ring 18 within the frustoconical portions 25, 26 inside the outer spigot 20 and the gland ring 16 causes the grip ring to be urged radially inwards and its internal ribs 29 to dig into the pipe 12, as shown in FIG. 4, thus securing the metal fitting 11 on the plastics pipe 12 and effecting sealing between the inside of the pipe and the outside 22 of the inner spigot 21.

The outer spigot 20 has a notch 30 extending from its free end 23 to beyond the adjacent edge 31 of the grip ring 18, to enable the end 32 proper of the inserted pipe 12 to De brought into view (see FIG. 3) to indicate proper positioning of the metal fitting on the plastics pipe before tightening of the screw fasteners 19.

The frustoconical portions 25, 26 have a cone angle of 15° to facilitate on site tightening of the screw fasteners 19 by a wrench or spanner without undue effort or leverage. The screw fasteners 19 are bolts 33 through holes 34, 35 in the flange means 14 and the gland ring 16, with bolt heads 36 in matching recesses 37 in the flange means and with nuts 38 and washers 39 abutting the gland ring. Also, in this embodiment, the flange means 14 is a flange integral with the first end 15 of the body 13 and the holes 34 in the flange are circumferentially spaced intermediate holes 40 (see FIG. 2) for bolts (not shown) for securing the flange 14 to another flanged fitting (not shown). The flange 14 extends radially from a spigot 41 for mating with a socket in another similarly flanged fitting.

The internal circumferentially disposed ribs 29 of the grip ring 18 are generally semicircular in axial cross-section and spaced apart by cylindrical portions 42 of the inside of the ring; the end ribs are spaced from the adjacent ends proper of the grip ring so that it can be inserted either way round in the fitting 11 and after tightening of the screw fasteners 19 by the requisite amount, the gap between the outside of the inserted pipe 12 and the end of grip ring adjacent the gland ring 16 will be fully closed (see FIG. 4), thus indicating full penetration of the ribs 29 into the pipe.

The external surfaces 27, 28 on the grip ring 18 are provided on axially disposed ribs 43 (see also FIGS. 7 and 8), whereby the portions of reduced thickness of the grip ring between the axially disposed ribs ensure adequate flexibility in the grip ring, but for larger pipe diameters, e.g. above 90 mm, the external surfaces of the grip ring may bew substantially complete surfaces of revolution, i.e., non-ribbed, such as shown as 27X and 28X in FIGS. 9 and 10.

In FIG. 5 the flange means 14 is the gland ring of a compression seal having an elasomeric sealing ring 44 in a socket 45 in the first end 15 of the body 13, e.g., for sealing on to a plain end pipe (not shown) of e.g., cast iron, steel, UPVC or asbestos-cement, and the bolts 33 of the screw fasteners 19 extend from one gland ring 14 to the other gland ring 16.

In FIG. 6 the flange means 14 is another gland ring adjacent the first end 15 of the body 13 and similar to the gland ring 16 at the other end 17 of the body, together with similar outer and inner tubular spigots 20, 21 integral with the first end of the body, and a similar grip ring 18, i.e., for securing and sealing on another plain pipe end (not shown), and the bolts 33 of the screw fasteners 19 again extend from one gland ring 14 to the other gland ring 16.

What we claim is:

1. A metal fitting for an end of a plain length of "rigid" plastics pipe comprising a body with flange means adjacent a first end, a gland ring adjacent the other end of the body, a grip and seal ring between the body and the gland ring, and screw fasteners for urging the gland ring towards the flange means;

the body having an integral outer tubular spigot projecting towards the gland ring and a co-axial integral inner tubular spigot having a cylindrical outer surface projecting beyond the free end of the outer tubular spigot, the inside of the outer spigot being provided with a frustoconical portion adjacent and converging from that free end;

the gland ring having its inside provided with a similar frustoconical portion converging in the opposite direction;

and the grip and seal ring being a split ring having an external surface mating with the frustoconical portions in the body and the gland ring, an a plurality of internal circumferentially disposed ribs initially spaced radially from the cylindrical outer surface of the inner spigot by no less than the thickness of a plain length of rigid plastics pipe on one end of which the metal fitting is intended to be fitted, the ribs being spaced apart by cylindrical portions of the inside of the grip and seal ring and the rib at the gland ring end of the grip and seal ring being spaced apart from the adjacent end proper of the grip and seal ring by a cylindrical portion of the inside of the grip and seal ring having the same diameter as the portions spacing the ribs apart, so that, after fasteners by the requisite amount, the gap between the outside of an inserted pipe and that end proper of the grip and seal ring will be fully closed, thus indicating full penetration of the ribs into the pipe.

2. A pipe fitting as in claim 1, characterised in that the frustoconical portions inside the outer spigot of the body and the gland ring, and the mating external surfaces on the grip ring, have a cone angle in the range of 10° to 20°, to facilitate on site tightening of the screw fasteners by a wrench or spanner without undue effort or leverage.

3. A pipe fitting as in claim 2, characterised in that the cone angle is 15°.

4. A pipe fitting as in claim 1, characterised in that the external surfaces on the grip ring, mating with the frustoconical portions inside the outer spigot and the gland ring, are provided on axially disposed ribs, whereby the portions of reduced thickness of the grip ring between the axially disposed ribs ensure adequate flexibility in the grip ring.

5. A pipe fitting as in claims 1, characterised in that the external surfaces on the grip ring, mating with the frustoconical portions inside the outer spigot and the gland ring are substantially complete surfaces of revolution.

6. A pipe fitting as in claim 1, characterised in that the flange means is the gland ring of a compression seal having an elastomeric sealing ring in a socket in the first end of the body.

7. A pipe fitting as in claim 6, characterised in that the screw fasteners extend from one gland ring to the other.

8. A pipe fitting as in claim 1, characterised in that the flange means is another gland ring adjacent the first end of the body and similar to the gland ring at the other end of the body, together with similar outer and inner tubular spigots integral with the first end of the body, and a similar grip ring, and in that the body has at least one intermediate integral flange to which the screw fasteners extend from the gland rings.

* * * * *